(12) United States Patent
Ikeda et al.

(10) Patent No.: US 8,469,516 B2
(45) Date of Patent: Jun. 25, 2013

(54) ILLUMINATION APPARATUS AND PROJECTION DISPLAY APPARATUS

(75) Inventors: Takashi Ikeda, Higashi Osaka (JP); Makoto Maeda, Osaka (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 431 days.

(21) Appl. No.: 12/727,308

(22) Filed: Mar. 19, 2010

(65) Prior Publication Data
US 2010/0328614 A1 Dec. 30, 2010

(30) Foreign Application Priority Data
Jun. 24, 2009 (JP) .................................. 2009-149652

(51) Int. Cl.
*G03B 21/00* (2006.01)
*G03B 21/14* (2006.01)
*G03B 21/28* (2006.01)
*G02B 5/30* (2006.01)
*G02B 27/28* (2006.01)
*F21V 9/14* (2006.01)

(52) U.S. Cl.
USPC ............ 353/20; 353/33; 353/81; 359/483.01; 362/19

(58) Field of Classification Search
USPC ..................... 353/20, 34, 81, 84; 359/483.01, 359/484.01, 885; 349/9; 362/19, 583
See application file for complete search history.

(56) References Cited

U.S. PATENT DOCUMENTS

| | | | |
|---|---|---|---|
| 7,066,603 B2 * | 6/2006 | Akiya .............................. | 353/81 |
| 7,347,562 B2 * | 3/2008 | Greenberg et al. ............. | 353/31 |
| 7,815,314 B2 | 10/2010 | Kanayama et al. | |
| 2002/0085179 A1 * | 7/2002 | Lee ................................ | 353/84 |
| 2005/0078278 A1 * | 4/2005 | Uehara et al. ................... | 353/20 |
| 2009/0002636 A1 * | 1/2009 | Yamamoto ...................... | 353/20 |
| 2009/0195714 A1 * | 8/2009 | Huang .............................. | 349/9 |

FOREIGN PATENT DOCUMENTS
| JP | 2005-043705 A | 2/2005 |
|---|---|---|
| JP | 2005-258163 A | 9/2005 |
| JP | 4286306 B2 | 4/2009 |

* cited by examiner

*Primary Examiner* — Tony Ko
*Assistant Examiner* — Jori S Reilly-Diakun
(74) *Attorney, Agent, or Firm* — Marvin A. Motsenbocker; Mots Law, PLLC

(57) ABSTRACT

An illumination apparatus includes: a polarization conversion element configured to align polarization directions of light emitted from a light source in one polarization direction; a color separation unit configured to separate the light whose polarization directions are aligned in the one polarization direction by the polarization conversion element; and a polarization adjustment element configured to adjust a polarization state of light in a predetermined wavelength band within a wavelength range of the light emitted from the light source. The polarization adjustment element is provided between the polarization conversion element and the color separation unit on an optical path of the light emitted from the light source.

5 Claims, 12 Drawing Sheets

ILLUMINATION APPARATUS AND PROJECTION DISPLAY APPARATUS

CROSS REFERENCE TO RELATED APPLICATIONS

This application is based upon and claims the benefit of priority from prior Japanese Patent Application No. 2009-149652, filed on Jun. 24, 2009; the entire contents of which are incorporated herein by reference.

BACKGROUND OF THE INVENTION

1. Field of the Invention

The present invention relates to an illumination apparatus and a projection display apparatus, each of which includes a light source and a reflective light valve configured to modulate light emitted from the light source.

2. Description of the Related Art

Conventionally, there has been known a projection display apparatus that has a light source, a light valve configured to modulate light emitted from the light source, and a projection unit configured to project the light outputted from the light valve onto a projection plane.

There is also known a projection display apparatus using a reflective light valve such as a digital micromirror device (DMD). Such projection display apparatus is provided with a uniformizing unit configured to make light emitted from a light source uniform and a color separation unit configured to separate the light made uniform by the uniformizing unit. A rod integrator, a fly-eye lens or the like is used as the uniformizing unit, for example. A color wheel, a color separating-combining prism or the like is used as the color separation unit, for example.

For the projection display apparatus using a reflective light valve such as a DMD, there is also proposed a technique (e.g., Japanese Patent Application Publication No. 2005-43705) to enhance the purities of color component light beams (e.g., a red component light, a green component light, and a blue component light) forming an image by removing unwanted light.

In the above-described projection display apparatus, unwanted light is removed to enhance the purities of color component light beams (e.g., a red component light, a green component light, and a blue component light) forming an image. Accordingly, the total amount of light to be guided to the reflective light valve is decreased.

SUMMARY OF THE INVENTION

An illumination apparatus of first aspect includes: a light source (light source 10); a reflective light valve (DMD 200) configured to modulate light emitted from the light source; a polarization conversion element (polarization conversion element 31) configured to align polarization directions of the light emitted from the light source in one polarization direction; a color separation unit (prism 70, prism 80 or color wheel 140) configured to separate the light whose polarization directions are aligned in the one polarization direction by the polarization conversion element; and a polarization adjustment element (polarization adjustment element 32) configured to adjust a polarization state of light in a predetermined wavelength band within a wavelength range of the light emitted from the light source. The polarization adjustment element is provided between the polarization conversion element and the color separation unit on an optical path of the light emitted from the light source.

In the first aspect, the color separation unit has at least a dichroic surface. The predetermined wavelength band includes a cutoff wavelength of the dichroic surface.

In the first aspect, the color separation unit is a color wheel configured to be rotatable and having a disc-shaped board surface. The normal line of the board surface provided to the color wheel is inclined with respect to an optical axis of the light emitted from the light source.

In the first aspect, the predetermined wavelength band includes either a wavelength band between a wavelength band of a blue component light and a wavelength band of a green component light, or a wavelength band between the wavelength band of the green component light and a wavelength band of a red component light.

A projection display apparatus of second aspect includes: a light source; a reflective light valve configured to modulate light emitted from the light source; a projection unit configured to project light outputted from the reflective light valve onto a projection plane; a polarization conversion element configured to align polarization directions of the light emitted from the light source in a one polarization direction; a color separation unit configured to separate the light whose polarization directions are aligned in the one polarization direction by the polarization conversion element; and a polarization adjustment element configured to adjust a polarization state of light in a predetermined wavelength band within a wavelength range of the light emitted from the light source. The polarization adjustment element is provided between the polarization conversion element and the color separation unit on an optical path of the light emitted from the light source.

DETAILED DESCRIPTION OF THE EMBODIMENTS

Hereinafter, an illumination apparatus and a projection display apparatus according to embodiments of the present invention will be described with reference to the drawings. In the following description of the drawings, the same or similar reference signs are attached to the same or similar units and portions.

It should be noted here that the drawings are schematic and ratios of dimensions and the like are different from actual ones. Therefore, specific dimensions and the like should be determined in consideration of the following description. Moreover, it is needless to say that the drawings also include portions having different dimensional relationships and ratios from each other.

OVERVIEW OF EMBODIMENTS

An illumination apparatus according to embodiments includes a light source and a reflective light valve configured to modulate light emitted from the light source. The illumination apparatus includes a polarization conversion element configured to align polarization directions of the light emitted from the light source in one polarization direction, a color separation unit configured to separate the light whose polarization directions are aligned in the one polarization direction by the polarization conversion element, and a polarization adjustment element configured to adjust a polarization state of light in a predetermined wavelength band included in a wavelength range of the light emitted from the light source. The polarization adjustment element is provided between the polarization conversion element and the color separation unit on an optical path of the light emitted from the light source.

A projection display apparatus according to the embodiments includes the above-described illumination apparatus and a projection unit configured to project light outputted from the reflective light valve onto a projection plane.

In the embodiment, the polarization adjustment element provided between the polarization conversion element and the color separation unit adjusts the polarization state of the light in a predetermined wavelength band within the wavelength range of the light emitted from the light source. On the other hand, the polarization adjustment element shifts a wavelength (a separation wavelength) in a boundary where the color separation unit separates the light guided to the color separation unit in accordance with the polarization state of the light guided to the color separation unit.

As a result, a decrease in the total amount of the light guided to the reflective light valve can be suppressed and the color reproduction range of an image to be projected onto the projection plane can also be switched.

First Embodiment

Projection Display Apparatus

Figure 1:
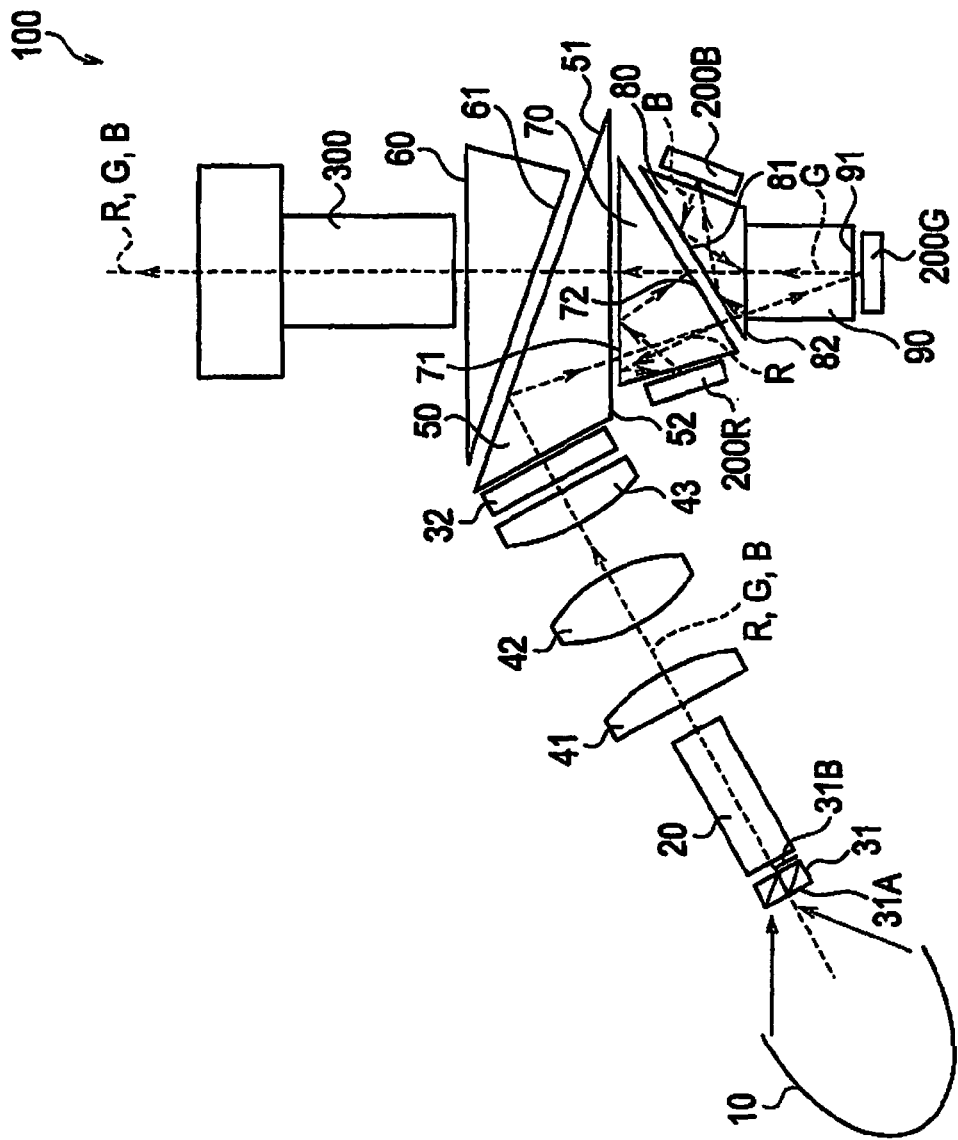
FIG. 1 is a view showing a projection display apparatus 100 according to a first embodiment.

Hereinafter, a projection display apparatus according to a first embodiment will be described with referent to FIG. 1. FIG. 1 is a view showing a projection display apparatus 100 according to the first embodiment. The first embodiment illustrates a case where the projection display apparatus 100 includes digital micromirror devices (DMD) as reflective light valves.

As shown in FIG. 1, the projection display apparatus 100 includes a light source 10, a rod integrator 20, a polarization conversion element 31, a polarization adjustment element 32, a lens group (a lens 41, a lens 42, a lens 43), a prism 50, a prism 60, a prism 70, a prism 80, a prism 90, multiple digital micromirror devices (DMDs) (DMD 200R, DMD 200G, DMD 200B), and a projection lens unit 300.

In the first embodiment, the light source 10, the prism group, and the DMD group constitute an illumination apparatus. In other words, the illumination apparatus has the configuration obtained by excluding the projection lens unit 300 from the projection display apparatus 100.

The light source 10 is a lamp configured to emit white light such as a UHP lamp or a xenon lamp. In other words, the light that the light source 10 emits includes a red component light R, a green component light G, and a blue component light B. In addition, the light that the light source 10 emits includes a cyan component light Cy in a wavelength band between those of the blue component light B and the green component light G, and a yellow component light Ye in a wavelength band between those of the green component light G and the red component light R.

The rod integrator 20 includes a light incident surface, a light outputting surface, and a light reflection side surface provided between an outer circumference of the light incident surface and an outer circumference of the light outputting surface. The rod integrator 20 is configured to uniformize the light emitted from the light source 10. In other words, the rod integrator 20 makes the light emitted from the light source 10 uniform by reflecting the light with the light reflection side surface.

The polarization conversion element 31 has a polarized beam splitter (PBS) 31A and a half wave plate 31B configured to align the polarization directions of the light emitted from the light source 10 in one polarization direction (e.g., a P polarization direction).

The polarization adjustment element 32 is a narrow-band polarization adjustment element. In detail, the polarization adjustment element is configured to adjust the polarization state of the light in a predetermined wavelength band within the wavelength range of the light emitted from the light source 10. The polarization adjustment element 32 is provided between the polarization conversion element 31 and a color separation unit on the optical path of the light emitted from the light source 10.

In the first embodiment, the color separation unit includes the prism 70 and the prism 80, as described later. The predetermined wavelength band includes a wavelength (a separation wavelength) in a boundary where the color separation unit separates the light led into the color separation unit.

Specifically, the polarization adjustment element 32 adjusts the polarization state of only the light in the predetermined wavelength band in accordance with a voltage to be applied thereto. On the other hand, the polarization adjustment element 32 does not adjust the polarization state of light in other wavelength bands regardless of a voltage to be applied thereto.

In the first embodiment, the light in the predetermined wavelength band is the cyan component light Cy and the yellow component light Ye. On the other hand, the light in other wavelength bands is the red component light R, the green component light G and the blue component light B.

For example, the polarization adjustment element 32 is configured to be able to selectively switch between a state where the polarization directions of the cyan component light Cy and the yellow component light Ye are not rotated and a state where the polarization directions of the cyan component light Cy and the yellow component light Ye are rotated at 90°. Alternatively, the polarization adjustment element 32 may adjust the polarization states of the cyan component light Cy and the yellow component light Ye within a range from 0° to 90°.

The lens group (the lenses 41, 42, and 43) are lenses which suppress an expansion of the light uniformized by the rod integrator 20 and approximately form an image of the light uniformized by the rod integrator 20 on each DMD 200.

The prism 50 is made of a light transmissive material, and includes a surface 51 and a surface 52. An air gap is provided between the prism 50 (the surface 51) and the prism 60 (a surface 61), and an angle (incident angle) at which the light outputted from the lens group enters the surface 51 is larger than a total reflection angle. For this reason, the light outputted from the lens group is reflected by the surface 51. On the other hand, an air gap is also provided between the prism 50 (the surface 52) and the prism 70 (a surface 71), and an angle (incident angle) at which the light outputted from the lens group enters the surface 52 is smaller than the total reflection angle. Thus, the light reflected by the surface 51 passes through the surface 52.

The prism 60 is made of a light transmissive material, and includes the surface 61.

The prism 70 is made of a light transmissive material, and includes the surface 71 and a surface 72. An air gap is provided between the prism 50 (the surface 52) and the prism 70 (the surface 71), and an angle (incident angle) at which each of the red component light R reflected by the surface 72 and the red component light R outputted from the DMD 200R enters the surface 71 is larger than the total reflection angle. Accordingly, the red component light R reflected by the surface 72 and the red component light R outputted from the DMD 200R are reflected by the surface 71.

The surface 72 is a dichroic mirror surface configured to transmit the green component light G and the blue component light B and to reflect the red component light R. Thus, in the light reflected by the surface 51, the green component light G and the blue component light B pass through the surface 72, but the red component light R is reflected by the surface 72. The red component light R reflected by the surface 71 is again reflected by the surface 72.

The prism 80 is made of a light transmissive material, and includes a surface 81 and a surface 82. An air gap is provided between the prism 70 (the surface 72) and the prism 80 (the surface 81). Since an angle (incident angle) at which each of the blue component light B passing through the surface 81 and then reflected by the surface 82, and the blue component light B outputted from the DMD 200B again enters the surface 81 is larger than the total reflection angle, the blue component light B passing through the surface 81 and then reflected by the surface 82, and the blue component light B outputted from the DMD 200B are reflected by the surface 81. On the other hand, since an angle (incident angle) at which the blue component light B outputted from the DMD 200B, reflected by the surface 81, and then reflected by the surface 82 again enters the surface 81 is smaller than the total reflection angle, the blue component light B outputted from the DMD 200B, reflected by the surface 81, and then reflected by the surface 82 passes through the surface 81.

The surface 82 is a dichroic mirror surface configured to transmit the green component light G and to reflect the blue component light B. Hence, in the light passing through the surface 81, the green component light G passes through the surface 82, whereas the blue component light B is reflected by the surface 82. The blue component light B reflected by the surface 81 is reflected by the surface 82. The green component light G outputted from the DMD 200G passes through the surface 82.

Here, the prism 70 separates white light into the red component light R and combine light including the green component light G and the blue component light B by means of the surface 72. The prism 80 separates the combine light into the green component light G and the blue component light B by means of the surface 82. In short, the prism 70 and the prism 80 function as a color separation unit to separate the color component light by colors.

Note that, in the first embodiment, the cutoff wavelength of the surface 72 of the prism 70 is set at a value between a wavelength band corresponding to the red component light R and a wavelength band corresponding to the green component light G. In other words, the cutoff wavelength of the surface 72 of the prism 70 is set at a value in the wavelength band of the yellow component light Ye.

In the first embodiment, the cutoff wavelength of the surface 82 of the prism 80 is set at a value between a wavelength band corresponding to the green component light G and a wavelength band corresponding to the blue component light B. In other words, the cutoff wavelength of the surface 82 of the prism 80 is set at a value in the wavelength band of the cyan component light Cy.

Meanwhile, the prism 80 combines the green component light G and the blue component light B by means of the surface 82. The prism 70 combines the red component light R and the combine light including the green component light G and the blue component light B by means of the surface 72. In short, the prism 70 and the prism 80 function as color combining units to combine color component light of all the colors.

The prism 90 is made of a light transmissive material, and includes a surface 91. The surface 91 is configured to transmit the green component light G. Here, the green component light G entering the DMD 200G and the green component light G outputted from the DMD 200G pass through the surface 91.

The DMD 200R, the DMD 200G and the DMD 200B are each formed of multiple movable micromirrors. Each of the micromirrors corresponds to one pixel, basically. The DMD 200R changes the angle of each micromirror to switch whether or not to reflect the red component light R toward the projection lens unit 300. Similarly, the DMD 200G and the DMD 200B change the angle of each micromirror to switch whether or not to reflect the green component light G and the blue component light B toward the projection lens unit 300, respectively.

The projection lens unit 300 is configured to project the light (image light) outputted from the prism 90 onto the projection plane.

(Configuration of Polarization Adjustment Element)

Figure 2:
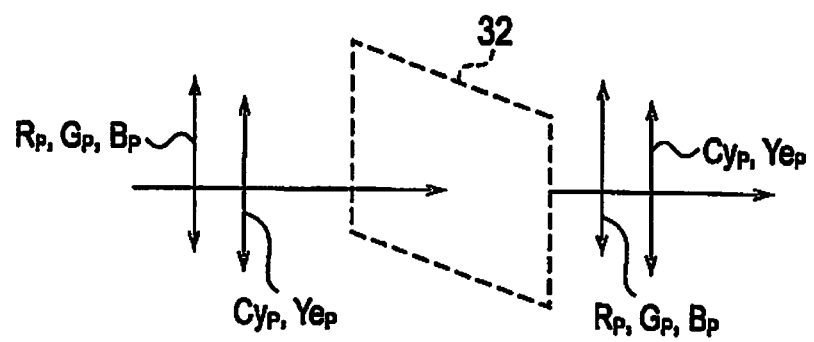
FIG. 2 is a view showing a polarization adjustment element 32 according to the first element.
Figure 3:
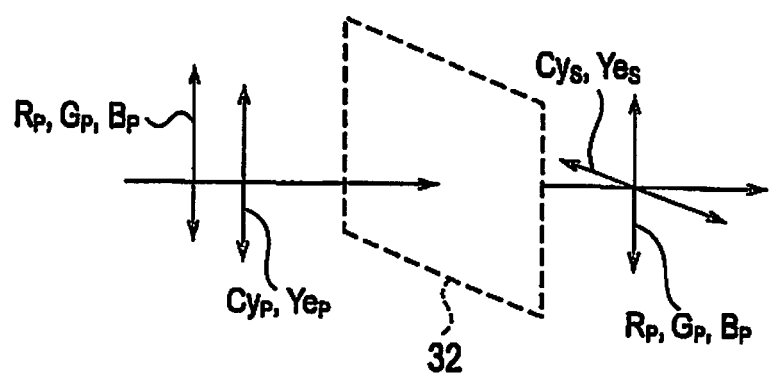
FIG. 3 is a view showing the polarization adjustment element 32 according to the first element.

Hereinafter, the configuration of the polarization adjustment element according to the first embodiment will be described with reference to FIGS. 2 and 3. FIGS. 2 and 3 are views each showing a vicinity of the polarization adjustment element 32 according to the first embodiment.

As shown in FIG. 2, the polarization adjustment element 32 transmits the cyan component light Cy and the yellow component light Ye without adjusting their polarization states while the polarization adjustment element 32 is in a first state, e.g., in a state where no voltage is being applied thereto. In other words, the polarization states of the cyan component light Cy and the yellow component light Ye are equal to the polarization states of the red component light R, the green component light G, and the blue component light B on the light exit side of the polarization adjustment element 32.

As shown in FIG. 3, the polarization adjustment element 32 transmits the cyan component light Cy and the yellow component light Ye after adjusting the polarization states of the cyan component light Cy and the yellow component light Ye while the polarization adjustment element 32 is in a second state, e.g., in a state where a voltage is applied thereto. In other words, the polarization states of the cyan component light Cy and the yellow component light Ye are different from the polarization states of the red component light R, the green component light G, and the blue component light B on the light exit side of the polarization adjustment element 32.

As described above, the polarization adjustment element 32 may adjust the polarization states of the cyan component light Cy and the yellow component light Ye in a range from 0° to 90°.

As described above, on the light exit side of the polarization adjustment element 32, the polarization adjustment element 32 controls ratios of a P polarization component and an S polarization component which are contained in the cyan component light Cy and the yellow component light Ye in accordance with a voltage to be applied thereto.

It should be noted that a predetermined wavelength band where the polarization adjustment element 32 performs the polarization state adjustment includes the cutoff wavelength of the surface 72 which is set in the wavelength band of the yellow component light Ye. In addition, the predetermined wavelength band where the polarization adjustment element 32 performs the polarization state adjustment includes the cutoff wavelength of the surface 82 which is set in the wavelength band of the cyan component light Cy.

(Shift of Cutoff Wavelength)

Hereinafter, a shift of the cutoff wavelength according to the first embodiment will be described. The cutoff wavelength of each dichroic surface (the surface 72 of the prism 70 and the surface 82 of the prism 80) shifts according to the polarization state of incident light. Specifically, the cutoff wavelength of the dichroic surface shifts so that transmitted light passing through the dichroic surface may become larger as the ratio of the P polarization component becomes larger. The cutoff wavelength of the dichroic surface shifts so that the ratio of light reflected by the dichroic surface may become larger as the ratio of the S polarization component becomes larger.

For example, the surface 72 of the prism 72, which separates the green component light G from the red component light R, transmits the green component light G. Thus, the ratio of the yellow component light Ye to be superimposed on the green component light G is larger as the ratio of the P polarization component contained in the yellow component light Ye is larger. The surface 72 of the prism 70, which separates the green component light G from the red component light R, reflects the red component light R. Thus, the ratio of the yellow component light Ye to be superimposed on the red component R is larger as the ratio of the S polarization component contained in the yellow component light Ye is larger.

On the other hand, the surface 82 of the prism 80, which separates the blue component light B from the green component light G, transmits the green component light G. Thus, the ratio of the cyan component light Cy to be superimposed on the green component light G is larger as the ratio of the P polarization component contained in the cyan component light Cy is larger. On the other hand, the surface 82 of the prism 80, which separates the blue component light B from the green component light G, reflects the blue component light B. Thus, the ratio of the cyan component light Cy to be superimposed on the blue component light B is larger as the ratio of the S polarization component contained in the cyan component light Cy is larger.

(Relationship between Polarization State and Color Reproduction Range)

Hereinafter, a relationship between a polarization state and a color reproduction range according to the first embodiment will be described with reference to FIGS. 4 to 9. FIGS. 4 to 9 are diagrams each showing a relationship between a polarization state and a color reproduction range according to the first embodiment.

(1) Case Where Ratio of P Polarization Component is 100%

Firstly, description will be given of a case where the ratio of a P polarization component contained in each of the cyan component light Cy and the yellow component light Ye is 100%.

Figure 4:
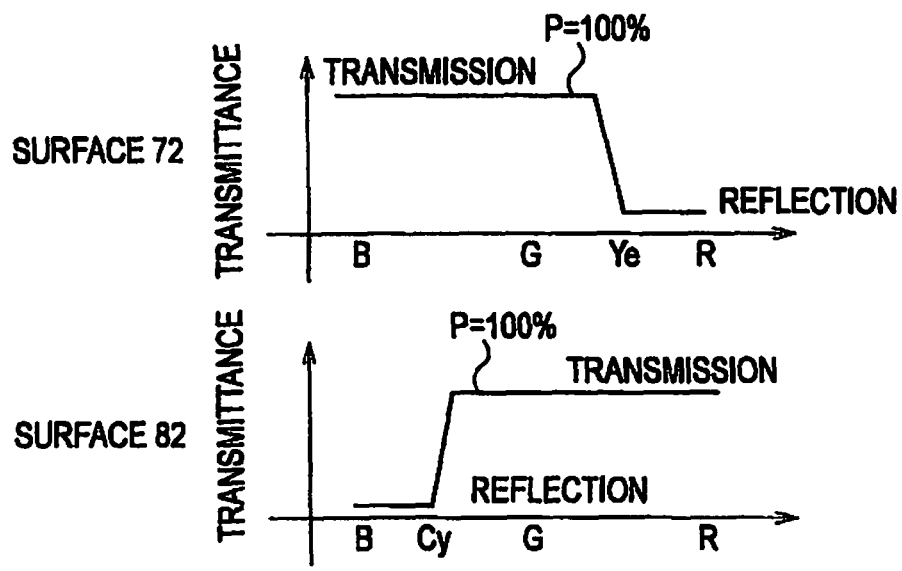
FIG. 4 is a diagram showing a relationship between a transmission and a reflection of each dichroic surfaces according to the first embodiment, when P polarization component is 100%.

As shown in FIG. 4, the yellow component light Ye is mainly superimposed on the green component light G because the ratio of the P polarization component contained in the yellow component light Ye is 100% on the surface 72 of the prism 70. In addition, the cyan component light Cy is mainly superimposed on the green component light G because the ratio of the P polarization component contained in the cyan component light Cy is 100% on the surface 82 of the prism 80.

Figure 5:
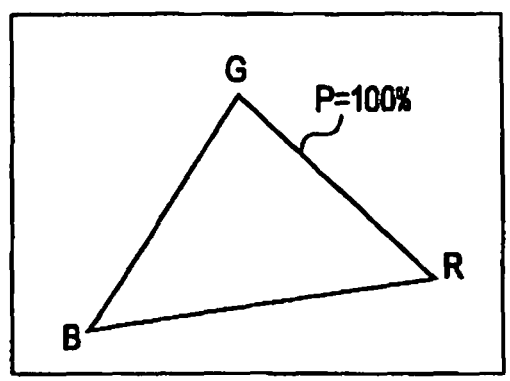
FIG. 5 is a diagram showing a color reproduction range according to the first embodiment, when P polarization component is 100%.

In such a case, the color reproduction range shown in FIG. 5 is achieved. In the following examples, color reproduction ranges will be described by using the case where the ratio of the P polarization component is 100% as a reference.

(2) Case Where Ratio of P Polarization Component is 50% and Ratio of S Polarization Component is 50%

Secondly, description will be given of a case where the ratio of a P polarization component contained in each of the cyan component light Cy and the yellow component light Ye is 50% and the ratio of an S polarization component contained therein is 50%.

Figure 6:
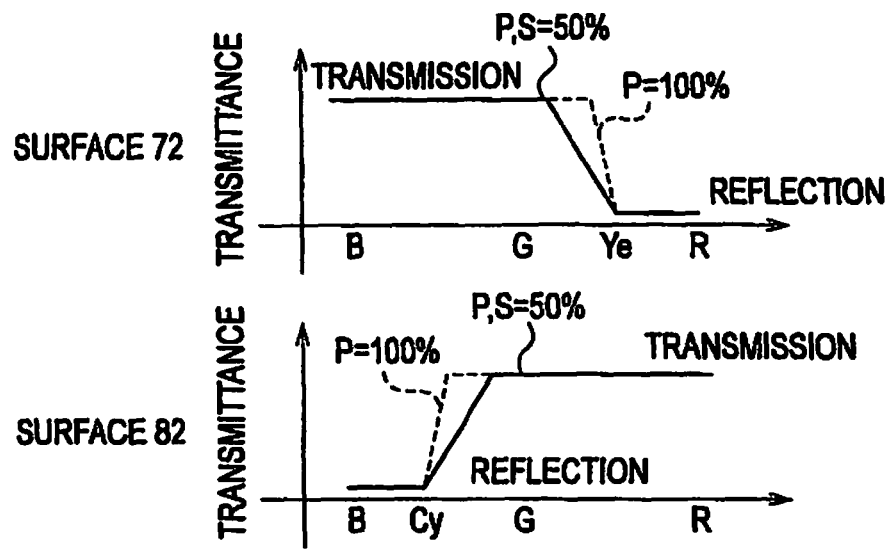
FIG. 6 is a diagram showing the relationship between the transmission and the reflection of each dichroic surfaces according to the first embodiment, when P polarization component is 50% and S polarization component is 50%.

As shown in FIG. 6, the yellow component light Ye is superimposed both on the red component light R and the green component light G because the yellow component light Ye contains 50% of the P polarization component and 50% of the S polarization component on the surface 72 of the prism 70. In other words, the yellow component light Ye is distributed to an optical path of the red component light R or an optical path of the green component light G. In addition, the cyan component light Cy is superimposed on both the green component light G and the blue component light B because the cyan component light Cy contains 50% of the P polarization component and 50% of the S polarization component on the surface 82 of the prism 80. In other words, the yellow component light Ye is distributed to an optical path of the green component light G or an optical path of the blue component light B.

Figure 7:
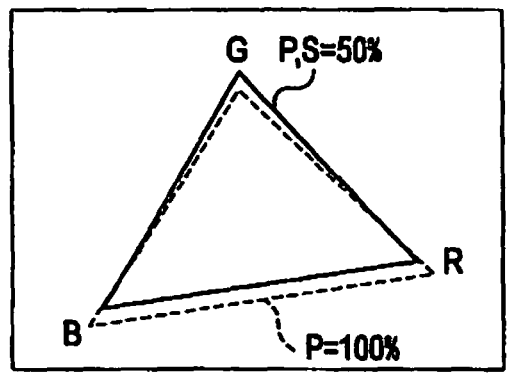
FIG. 7 a diagram showing the color reproduction range according to the first embodiment, when P polarization component is 50% and S polarization component is 50%.

In such a case, the color reproduction range shown in FIG. 7 is achieved. A part of the cyan component light Cy and a part of the yellow component light Ye are not superimposed on the green component light G. Accordingly, in the color reproduction range shown in FIG. 7, the purity of green color is increased as compared with that in the color reproduction range shown in FIG. 5. In contrast, a part of the cyan component light Cy is superimposed on the blue component light B. Accordingly, in the color reproduction range shown in FIG. 7, the purity of blue color is decreased as compared with that in the color reproduction range shown in FIG. 5. Similarly, a part of the yellow component light Ye is superimposed on the red component light R. Accordingly, in the color reproduction range shown in FIG. 7, the purity of red color is decreased as compared with that in the color reproduction range shown in FIG. 5.

(3) Case Where Ratio of S Polarization Component is 100%

Thirdly, description will be given of a case where the ratio of an S polarization component contained in each of the cyan component light Cy and the yellow component light Ye is 100%.

Figure 8:
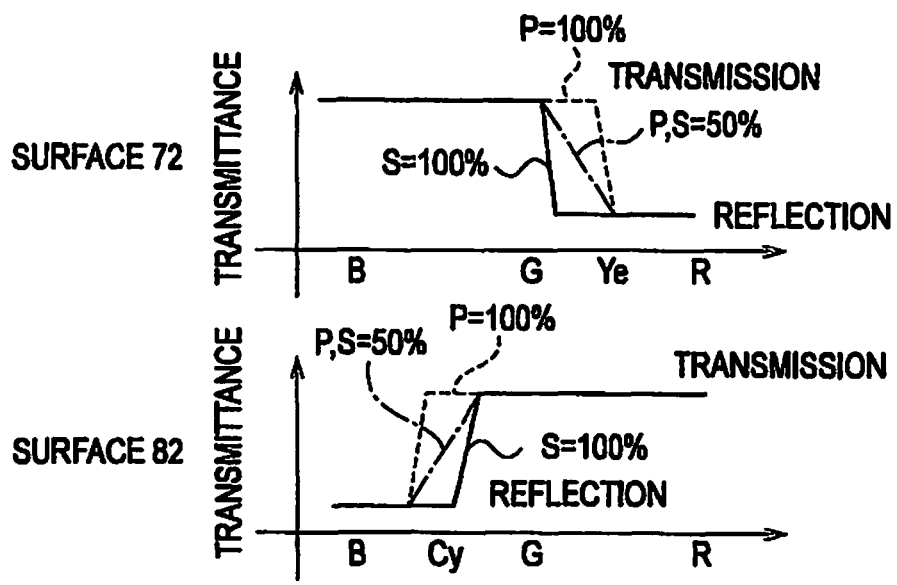
FIG. 8 is a diagram showing the relationship between the transmission and the reflection of each dichroic surfaces according to the first embodiment, when S polarization component is 100%.

As shown in FIG. 8, the yellow component light Ye is mainly superimposed on the red component light R because the ratio of the S polarization component contained in the yellow component light Ye is 100% on the surface 72 of the prism 70. In addition, the cyan component light Cy is mainly superimposed on the blue component light B because the ratio of the S polarization component contained in the cyan component light Cy is 100% on the surface 82 of the prism 80.

Figure 9:
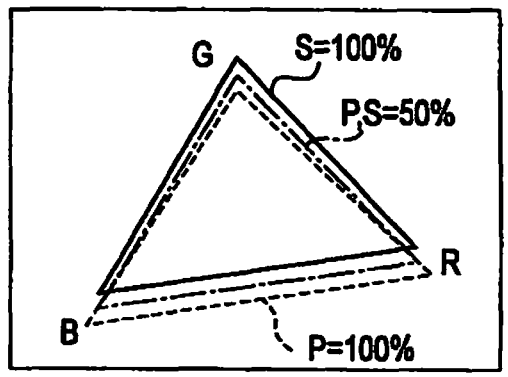
FIG. 9 is a diagram showing the color reproduction range according to the first embodiment, when S polarization component is 100%.

In such a case, the color reproduction range shown in FIG. 9 is achieved. The cyan component light Cy and the yellow component light Ye are hardly superimposed on the green component light G. Accordingly, in the color reproduction range shown in FIG. 9, the purity of green color is further increased as compared with that in the color reproduction range shown in FIG. 5. In other words, in the color reproduction range shown in FIG. 9, the purity of green color is increased as compared with that in the color reproduction range shown in FIG. 7.

In contrast, the yellow component light Ye is mainly superimposed on the red component light R. Accordingly, in the color reproduction range shown in FIG. 9, the purity of red color is further decreased as compared with that in the color reproduction range shown in FIG. 5. Similarly, the cyan component light Cy is mainly superimposed on the blue component light B. Accordingly, in the color reproduction range shown in FIG. 9, the purity of blue color is further decreased as compared with that in the color reproduction range shown in FIG. 5. In other words, in the color reproduction range shown in FIG. 9, the purities of red color and blue color are decreased as compared with those in the color reproduction range shown in FIG. 7.

(Advantageous Effects)

In the first embodiment, the polarization adjustment element 32 provided between the polarization conversion element 31 and the color separation unit (the prism 70 and the prism 80) adjusts the polarization states of the cyan component light Cy and the yellow component light Ye in the wavelength range of the light emitted from the light source 10. On the other hand, the wavelength (the cutoff wavelength of each of the surface 72 and the surface 82) to separate the light guided to the color separation unit shifts in accordance with the polarization state of the light guided to the color separation unit.

Specifically, the polarization adjustment element 32 controls the ratios of the P polarization component and the S polarization component contained in the cyan component light Cy and the yellow component light Ye to be superimposed on the red component light R, the green component light G and the blue component light B, so that the color reproduction range of an image to be projected onto the projection plane is switched.

With this configuration, a decrease in the total amount of the light guided to the DMDs 200 can be suppressed and the color reproduction range of an image to be projected onto the projection plane can also be switched.

The predetermined wavelength band where the polarization adjustment element 32 performs the polarization state control includes the cutoff wavelengths of the surface 72 and the surface 82. Accordingly, the light beams having boundary wavelengths between the red component light R, the green component light G, and the blue component light B (the cyan component light Cy and the yellow component light Ye) can be properly distributed to the individual optical paths while the purities of the red component light R, the green component light G, and the blue component light B are kept at certain levels.

Each DMD 200 is configured to modulate a color component light by changing the angles of its micromirrors. Accordingly, it should be noted that in a case where the DMDs 200 are used as reflective light valves, the polarization state of each color component light is generally unconsidered.

First Modified Example

Figure 10:
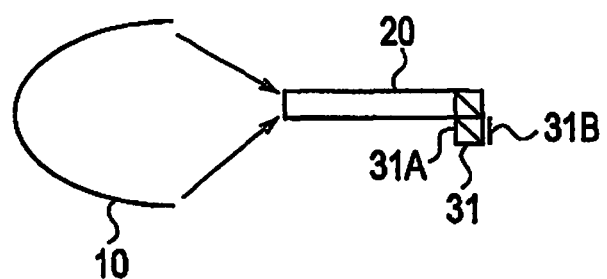
FIG. 10 is a view for explaining a first modified example.

Hereinafter, a first modified example of the first embodiment will be described with reference to FIG. 10. The following description will be provided mainly for different points from the first embodiment.

Specifically, in the first embodiment, the polarization conversion element 31 is provided on the light incident side of the rod integrator 20. In contrast, in the first modified example, as shown in FIG. 10, the polarization conversion element 31 (the PBS 31A and the half wave plate 31B) is provided on the light exit side of the rod integrator 20.

For instance, the first modified example should preferably be applied to a case where a reflector provided to the light source 10 has an elliptic cross-section and thus is configured to collect light.

Second Modified Example

Figure 11:
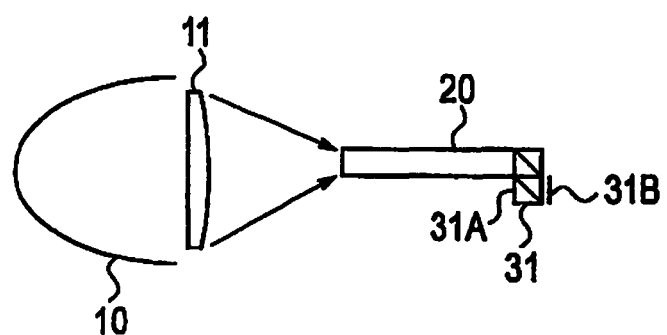
FIG. 11 is a view for explaining a second modified example.

Hereinafter, a second modified example of the first embodiment will be described with reference to FIG. 11. The following description will be provided mainly for different points from the first embodiment and the first modified example.

Specifically, the first embodiment and the first modified example do not particularly mention collection of the light emitted from the light source 10. In contrast, in the second modified example, as shown in FIG. 11, a condenser lens 11 configured to collect the light emitted from the light source 10 is provided. The condenser lens 11 collects the light emitted from the light source 10 onto the light incident surface of the rod integrator 20.

For instance, the second modified example should preferably be applied to a case where a reflector provided to the light source 10 has a parabolic cross-section and thus is configured to reflect the light as parallel light.

Third Modified Example

Figure 12:
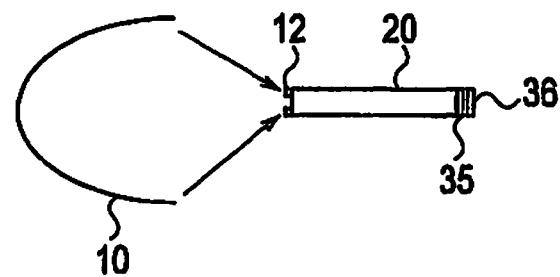
FIG. 12 is a view for explaining a third modified example.

Hereinafter, a third modified example of the first embodiment will be described with reference to FIG. 12. The following description will be provided mainly for different points from the first embodiment.

Specifically, in the third modified example, how the polarization directions of the light emitted from the light source 10 are aligned is different from those in the first embodiment and the first modified example. In the third modified example, as shown in FIG. 12, a mirror 12, a ¼λ wave plate 35, and a reflective polarizing plate 36 are provided in place of the polarization conversion element 31.

The mirror 12 is provided on the light incident surface of the rod integrator 20. The ¼λ wave plate 35 is configured to change the phase of light by ¼λ. The reflective polarizing plate 36 is configured to transmit light having one polarization direction and to reflect light having other polarization directions.

Light guided to the rod integrator 20 is reflected by the mirror 12 and the reflective polarizing plate 36, until the polarization directions of the light are aligned in one polarization direction. In other words, the light guided to the rod integrator 20 reciprocates in the rod integrator 20 until the polarization directions of the light are aligned in one polarization direction. In this manner, the polarization directions of the light guided to the rod integrator 20 are aligned in one polarization direction.

Fourth Modified Example

Figure 13:
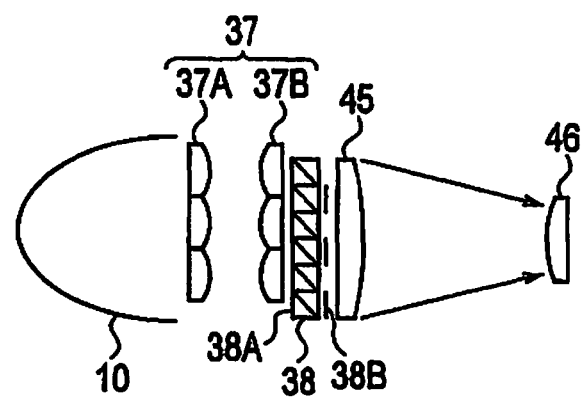
FIG. 13 is a view for explaining a fourth modified example.

Hereinafter, a fourth modified example of the first embodiment will be described with reference to FIG. 13. The following description will be provided mainly for different points from the first embodiment.

Specifically, in the fourth modified example, how the light emitted from the light source 10 is made uniform and how the polarization directions of the light are aligned are different from those in the first embodiment and the first modified example. In the fourth modified example, as shown in FIG. 13, a fly-eye lens unit 37, a PBS array 38, and a condenser lens group (a lens 45 and a lens 46) are provided in place of the rod integrator 20 and the polarization conversion element 31.

The fly-eye lens unit 37 includes fly-eye lenses 37A and fly-eye lenses 37B and is configured to uniformize the light emitted from the light source 10. The PBS array 38 includes PBSs 38A and wave plates 38B configured to align the polarization directions of the light outputted from the fly-eye lens unit 37 in one polarization direction. The lens 45 and the lens 46 are configured to collect the light outputted from the PBS array 38.

Second Embodiment

Hereinafter, a second embodiment will be described with reference to the drawings. The following description will be provided mainly for different points from the first embodiment.

Specifically, in the first embodiment, the color separating-combining prism group (the prism 70 and the prism 80) is provided as a color separation unit. In contrast, in the second embodiment, a color wheel is provided as a color separation unit.

(Projection Display Apparatus)

Figure 14:
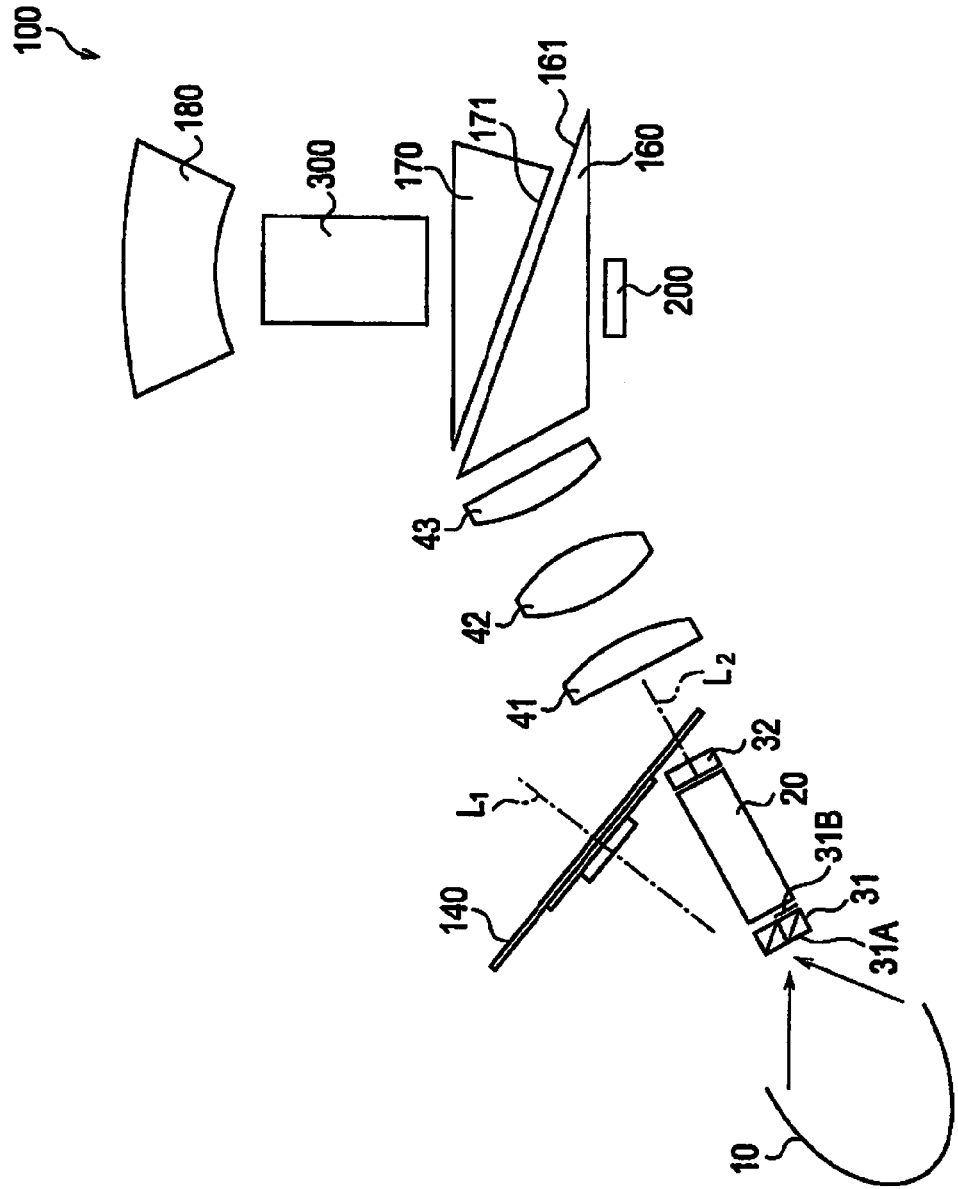
FIG. 14 is a view showing a projection display apparatus 100 according to a second embodiment.

Hereinafter, a projection display apparatus according to a second embodiment will be described with reference to FIGS. 14 and 15. FIG. 14 is a view showing a projection display apparatus 100 according to the second embodiment. The second embodiment illustrates a case where the projection display apparatus 100 includes a digital micromirror device (DMD) as a reflective light valve. In FIG. 14, the same reference signs are attached to the same components as those of FIG. 1.

As shown in FIG. 14, similar to the first embodiment, the projection display apparatus 100 includes a light source 10, a rod integrator 20, a polarization conversion element 31, a polarization adjustment element 32, a lens group (a lens 41, a lens 42, and a lens 43), a DMD 200, and a projection lens unit 300. In addition, the projection display apparatus 100 has a color wheel 140, a prism 160, a prism 170, and an aspherical mirror 180.

The color wheel 140 is configured to be rotatable and has a disc-shaped board surface. A normal $L_1$ of the board surface which is provided to the color wheel 140 is inclined with respect to an optical axis $L_2$ of light emitted from the light source 10.

Figure 15:
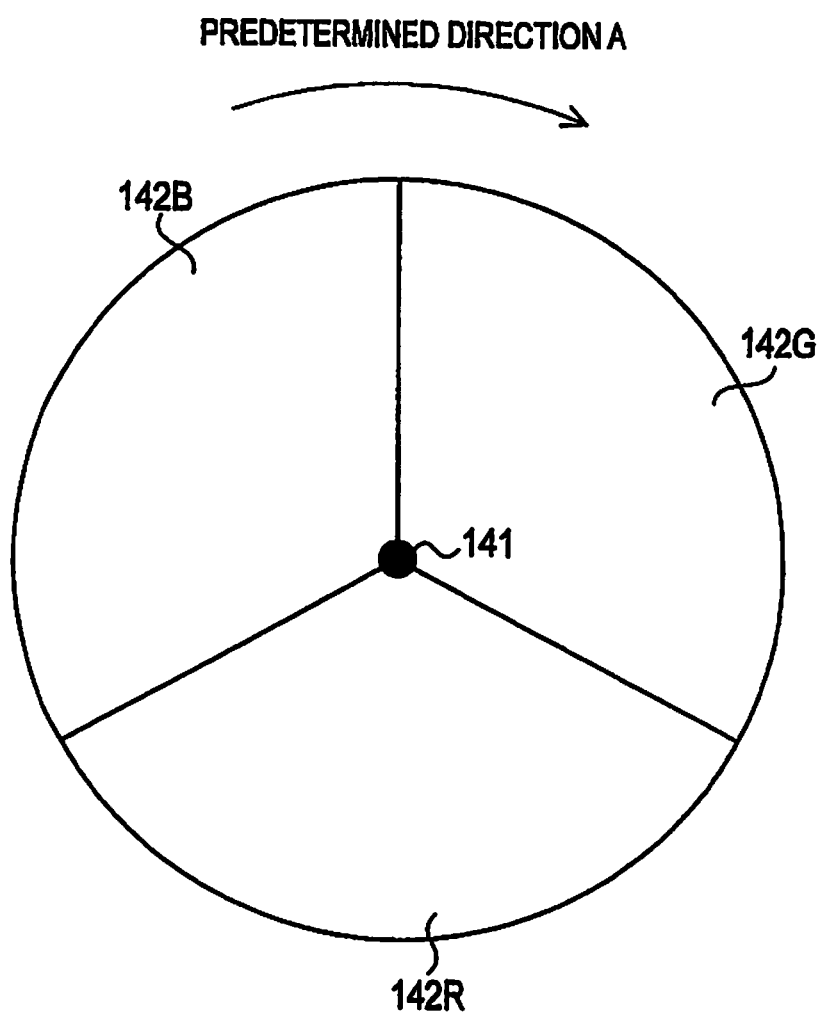
FIG. 15 is a view showing a color wheel according to the second embodiment.

Specifically, as shown in FIG. 15, the color wheel 140 is configured to be rotatable around a rotary shaft 141. The disc-shaped board surface which is provided to the color wheel 140 includes a red transmission region 142R, a green transmission region 142G, and a blue transmission region 142B. The red transmission region 142R is a region which transmits a red component light R and blocks light other than the red component light R. The green transmission region 142G is a region which transmits a green component light G and blocks light other than the green component light G. The blue transmission region 142B is a region which transmits a blue component light B and blocks light other than the blue component light B.

In the second embodiment, the transmission regions are set in the order of the red transmission region 142R, the blue transmission region 142B, and the green transmission region 142G in a predetermined direction A.

The prism 160 is made of a light transparent material and includes a surface 161. The prism 170 is made of a light transparent material and includes a surface 171.

An air gap is provided between the prism 160 (the surface 161) and the prism 170 (the surface 171), and an angle at which the light outputted from the lens group enters the surface 161 (incident angle) is larger than a total reflection angle. Thus, the light outputted from the lens group is reflected by the surface 161. On the other hand, an angle at which the light outputted from the DMD 200 enters the surface 161 (incident angle) is smaller than the total reflection angle. Thus, the light outputted from the DMD 200 passes through the surface 161.

The aspherical mirror 180 is configured to reflect the light outputted from the projection lens unit 300 (an image light) toward a projection plane. The light outputted from the projection lens unit 300 (an image light) is enlarged by the aspherical mirror 180.

(Shift of Transmission Wavelength)

Hereinafter, a shift of a transmission wavelength according to the second embodiment will be described. The transmission wavelengths of the transmission regions (the red transmission region 142R, the green transmission region 142G, and the blue transmission region 142B) shift in accordance with the polarization state of incident light.

For example, in the red transmission region 142R, the ratio of a yellow component light Ye to be superimposed on a red component light R is smaller as the ratio of a P polarization component contained in the yellow component Ye is larger. In the red transmission region 142R, the ratio of the yellow component light Ye to be superimposed on the red component light R is larger as the ratio of an S polarization component contained in the yellow component light Ye is larger.

In the green transmission region 142G, the ratio of each of a cyan component light Cy and a yellow component light Ye to be superimposed on a green component light G is larger as the ratio of a P polarization component contained in each of the cyan component light Cy and the yellow component light Ye is larger. In contrast, in the green transmission region 142G, the ratio of each of the cyan component light Cy and the yellow component light Ye to be superimposed on the green component light G is smaller as the ratio of an S polarization component contained in each of the cyan component light Cy and the yellow component light Ye is larger.

In the blue transmission region 142B, the ratio of a cyan component light Cy to be superimposed on a blue component light B is smaller as the ratio of a P polarization component contained in the cyan component light Cy is larger. In contrast, in the blue transmission region 142B, the ratio of the cyan component light Cy to be superimposed on the blue component light B is larger as the ratio of an S polarization component contained in the cyan component light Cy is larger.

(Relationship Between Polarization State and Color Reproduction Range)

Hereinafter, a relationship between a polarization state and a color reproduction range will be described with reference to FIGS. 16 to 21. FIGS. 16 to 21 are diagrams each showing a relationship between a polarization state and a color reproduction range according to the second embodiment.

(1) Case Where Ratio of P Polarization Component is 100%

Firstly, description will be given of a case where the ratio of a P polarization component contained in each of the cyan component light Cy and the yellow component light Ye is 100%.

Figure 16:
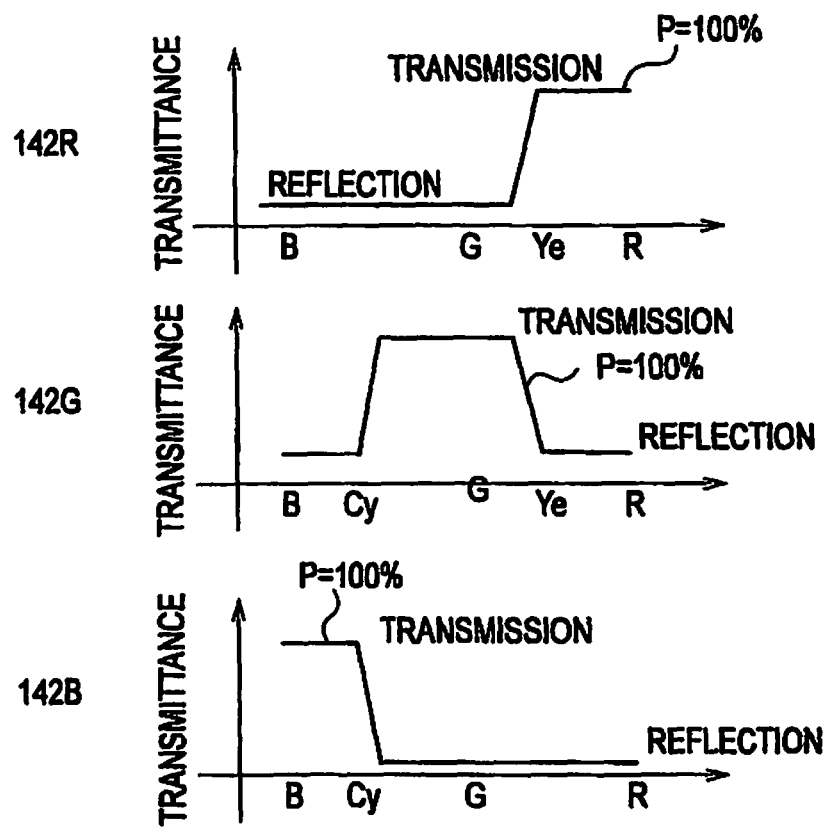
FIG. 16 is a diagram showing a relationship between the transmission and the reflection of each transmission regions according to the second embodiment, when P polarization component is 100%.

As shown in FIG. 16, in the red transmission region 142R, the ratio of the P polarization component contained in the yellow component light Ye is 100%. Thus, the ratio of the yellow component light Ye to be superimposed on the red component light R is small. In the green transmission region 142G, the ratio of the P polarization component contained in each of the cyan component light Cy and the yellow component light Ye is 100%. Thus, the ratio of each of the cyan component light Cy and yellow component light Ye to be superimposed on the green component light G is large. In the blue transmission region 142B, the ratio of the P polarization component contained in the cyan component light Cy is 100%. Thus, the ratio of the cyan component light Cy to be superimposed on the blue component light B is small.

Figure 17:
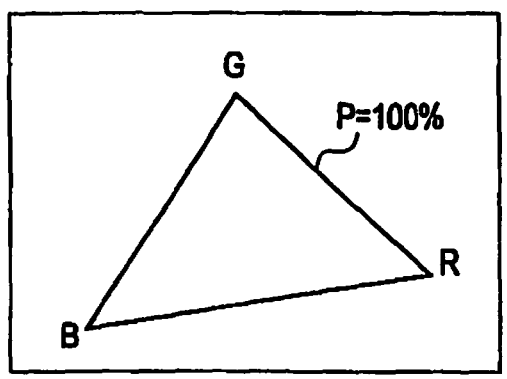
FIG. 17 is a diagram showing the color reproduction range according to the second embodiment, when P polarization component is 100%.

In such a case, the color reproduction range shown in FIG. 17 is achieved. In the following examples, color reproduction ranges will be described by using the case where the ratio of the P polarization component is 100% as a reference.

(2) Case Where Ratio of P Polarization Component is 50% and Ratio of S Polarization Component is 50%

Secondly, description will be given of a case where the ratio of a P polarization component contained in each of the cyan component light Cy and the yellow component light Ye is 50% and the ratio of an S polarization component contained therein is 50%.

Figure 18:
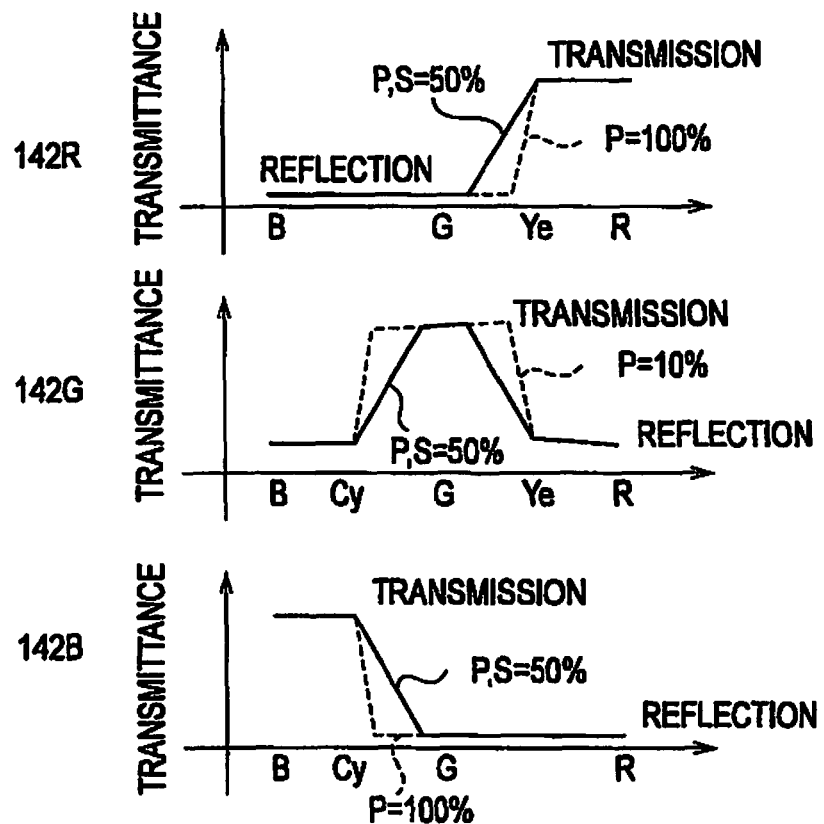
FIG. 18 is a diagram showing the relationship between the transmission and the reflection of each transmission regions according to the second embodiment, when P polarization component is 50% and S polarization component is 50%.

As shown in FIG. 18, in the red transmission region 142R, the yellow component light Ye contains 50% of the P polarization component and 50% of the S polarization component. Thus, the ratio of the yellow component light Ye to be superimposed on the red component light R increases. In the green transmission region 142G, each of the cyan component light Cy and the yellow component light Ye contains 50% of the P polarization and 50% of the S polarization. Thus, the ratio of each of the cyan component light Cy and the yellow component light Ye to be superimposed on the green component light G decreases. In the blue transmission region B, the cyan component light Cy contains 50% of the P polarization component and 50% of the S polarization component. Thus, the ratio of the cyan component light Cy to be superimposed on the blue component light B increases.

Figure 19:
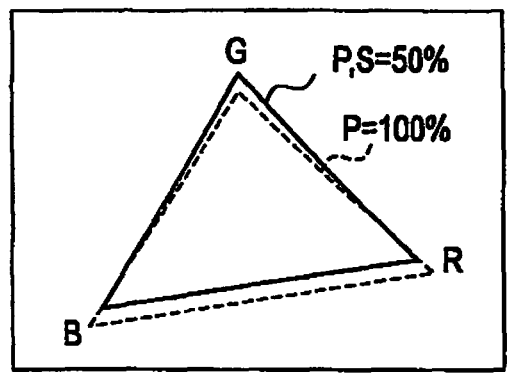
FIG. 19 is a diagram showing the color reproduction range according to the second embodiment, when P polarization component is 50% and S polarization component is 50%.

In such a case, the color reproduction range shown in FIG. 19 is achieved. The ratio of each of the cyan component light Cy and the yellow component light Ye to be superimposed on the green component light G decreases. Accordingly, in the color reproduction range shown in FIG. 19, the purity of green color is increased as compared with that in the color reproduction range shown in FIG. 17. In contrast, the ratio of the yellow component light Ye to be superimposed on the red component light R is increased and the ratio of the cyan component light Cy to be superimposed on the blue component light B is increased. Accordingly, in the color reproduction range shown in FIG. 19, the purities of red color and blue color are decreased as compared with those in the color reproduction range shown in FIG. 17.

(3) Case Where Ratio of S Polarization Component is 100%

Thirdly, description will be given of a case where the ratio of an S polarization component contained in each of the cyan component light Cy and the yellow component light Ye is 100%.

Figure 20:
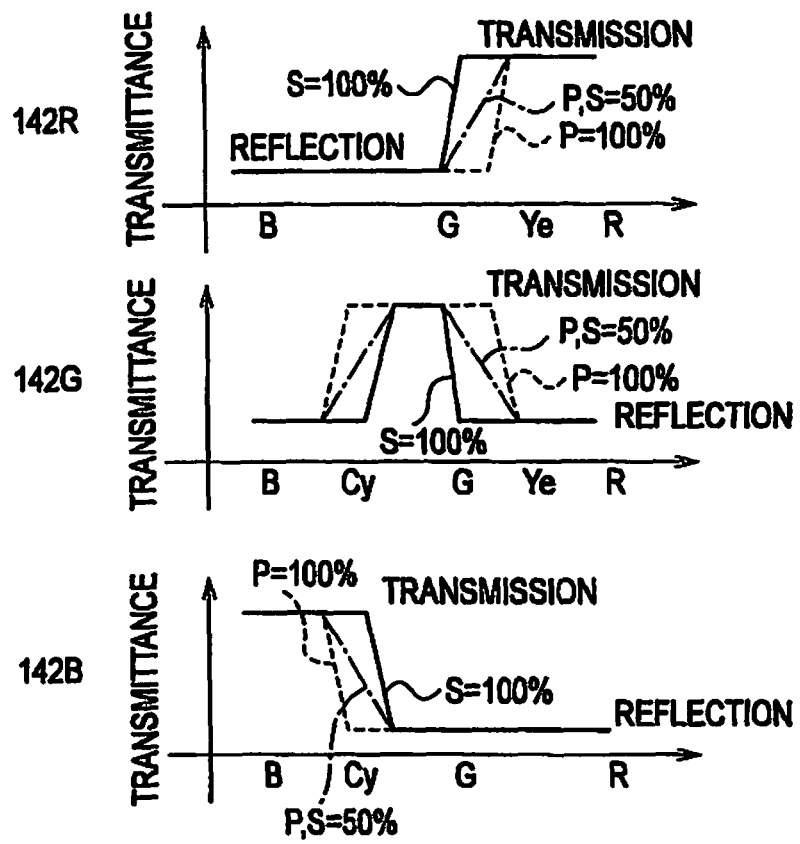
FIG. 20 is a diagram showing the relationship between the transmission and the reflection of each transmission regions according to the second embodiment, when S polarization component is 100%.

As shown in FIG. 20, in the red transmission region 142R, the ratio of the S polarization component contained in the yellow component light Ye is 100%. Accordingly, the ratio of the yellow component light Ye to be superimposed on the red component light R is large. In the green transmission region 142G, the ratio of the S polarization component contained in each of the cyan component light Cy and the yellow component light Ye is 100%. Accordingly, the ratio of each of the cyan component light Cy and the yellow component light Ye to be superimposed on the green component light G is small. In the blue transmission region 142B, the ratio of the S polarization component contained in the cyan component light Cy is 100%. Accordingly, the ratio of the cyan component light Cy to be superimposed on the blue component light B is large.

Figure 21:
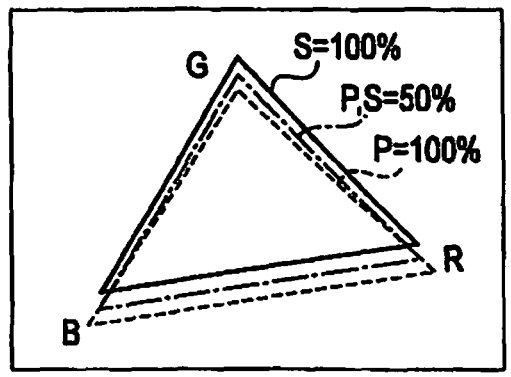
FIG. 21 is a diagram showing the color reproduction range according to the second embodiment, when S polarization component is 100%.

In such a case, the color reproduction range shown in FIG. 21 is achieved. The ratio of each of the cyan component light Cy and the yellow component light Ye to be superimposed on the green component light G is further decreased. Accordingly, in the color reproduction range shown in FIG. 21, the purity of green color is further increased as compared with that in the color reproduction range shown in FIG. 17. In other words, in the color reproduction range shown in FIG. 21, the purity of green color is increased as compared with that in the color reproduction range shown in FIG. 19.

In contrast, the ratio of the yellow component light Ye to be superimposed on the red component light R is further increased and the ratio of the cyan component light Cy to be superimposed on the blue component light B is further increased. Accordingly, in the color reproduction range shown in FIG. 21, the purities of red color and blue color are further decreased as compared with those in the color reproduction range shown in FIG. 17. In other words, in the color reproduction range shown in FIG. 21, the purities of red color and blue color are decreased as compared with those in the color reproduction range shown in FIG. 19.

(Advantageous Effects)

In the second embodiment, the polarization adjustment element 32 provided between the polarization conversion element 31 and the color separation unit (the color wheel 140) adjusts the polarization states of the cyan component light Cy and the yellow component light Ye in the wavelength range of the light emitted from the light source 10. On the other hand, the wavelength (the transmission wavelength of each of the red transmission region 142R, the green transmission region 142G, and the blue transmission region 142B) to separate the light guided to the color wheel 140 shifts in accordance with the polarization state of the light guided to the color wheel 140.

Specifically, the polarization adjustment element 32 controls the light amounts of the cyan component light Cy and the yellow component light Ye to be superimposed on the red component light R, the green component light G, and the blue component light B, so that the color reproduction range of an image to be projected onto the projection plane can be switched.

With this configuration, a decrease in the total amount of the light guided to the DMD 200 can be suppressed and the color reproduction range of an image to be projected onto the projection plane can also be switched.

Other Embodiments

As described above, the details of the present invention have been described by using the embodiments of the present invention. However, it should not be understood that the description and drawings which constitute part of this disclosure limit the present invention. From this disclosure, various alternative embodiments, examples, and operation techniques will be easily found by those skilled in the art.

In the embodiments, the polarization adjustment element 32 adjusts the polarization states of the cyan component light Cy and the yellow component light Ye. However, embodiments are not limited to these.

For example, the polarization adjustment element 32 may adjust the polarization state of only the cyan component light Cy. Alternatively, the polarization adjustment element 32 may adjust the polarization state of only the yellow component light Ye.

Furthermore, there may be provided a polarization adjustment element that adjusts the polarization state of only the cyan component light Cy and a polarization adjustment element that adjusts the polarization state of only the yellow component light Ye, in place of the polarization adjustment element 32. With this configuration, the polarization states of the cyan component light Cy and the yellow component light Ye are individually controlled, thereby increasing variations of the color reproduction range.

In the embodiments, the DMD 200 is illustrated as a reflective light valve. However, embodiments are not limited to this.

The embodiments has illustrated the cases where the cutoff wavelength of the dichroic surface shifts so that the ratio of the transmission light passing through the dichroic surface may become larger as the ratio of the P polarization component becomes larger and where the cutoff wavelength of the dichroic surface shifts so that the ratio of the light reflected by the dichroic surface may become larger as the ratio of the S polarization component becomes larger. However, embodiments are not limited to these.

For example, in some configuration of a dielectric multilayer forming the dichroic surface, the cutoff wavelength of the dichroic surface may shift so that the ratio of the light reflected by the dichroic surface may become larger as the ratio of the P polarization component becomes larger. Similarly, the cutoff wavelength of the dichroic surface may shift so that the ratio of the light passing through the dichroic surface may become larger as the ratio of the S polarization component becomes larger.

It should be noted that the wavelength range of the light passing through the light incident surface, such as the dichroic surface or the color wheel surface, (transmission wavelength range) and the wavelength range of the light reflected by the light incident surface (reflection wavelength range) change depending on the vibration direction of the incident light with respect to the light incident surface. In other words, as a result of adjustment of the polarization state made by the polarization adjustment element 32, the vibration direction of the incident light with respect to the light incident surface is fixed. Thus, it should be noted that the transmission wavelength range and the reflection wavelength range change depending on the inclination of the light incident surface.

In the second embodiment, the transmission regions are set in the order of the red transmission region 142R, the blue transmission region 142B, and the green transmission region 142G in the predetermined direction A. However, the order of setting the transmission regions is not particularly limited. For example, the transmission regions may be set in the order of the blue transmission region 142B, the red transmission region 142R, and the green transmission region 142G in the predetermined direction A.

In the second embodiment, the color wheel 140 includes the red transmission region 142R, the green transmission region 142G, and the blue transmission region 142B. However, embodiments are not limited to this. The color wheel 140 may include at least one or more of a yellow transmission region, a cyan transmission region, and a magenta transmission region in addition to the red transmission region, the green transmission region, and the blue transmission region.

In the second embodiment, the color wheel 140 is divided into three transmission regions. However, embodiments are not limited this. The color wheel 140 may be divided into four or more transmission regions. For example, the color wheel 140 may have a first red transmission region (e.g., for red light transmission), a second red transmission region (e.g., for yellow light transmission), a first green transmission region (e.g., for green light transmission), a second green transmission region (e.g., for cyan light transmission), a first blue transmission region (e.g., for blue light transmission), and a second blue transmission region (e.g., for magenta light transmission).

What is claimed is:

1. An illumination apparatus comprising:
a light source;
a reflective light valve configured to modulate light emitted from the light source;
a polarization conversion element configured to align polarization directions of the light emitted from the light source in one polarization direction;
a color separation unit configured to separate the light whose polarization directions are aligned in the one polarization direction by the polarization conversion element; and
a polarization adjustment element configured to adjust a polarization state of light in a predetermined wavelength band within a wavelength range of the light emitted from the light source, wherein the polarization adjustment element is provided between the polarization conversion element and the color separation unit on an optical path of the light emitted from the light source and the polarization adjustment element adjusts a ratio of a P polarization component and a S polarization component included in light having the predetermined wavelength band in accordance with applied voltage to the polarization adjustment element.

2. The illumination apparatus according to claim 1, wherein
the color separation unit has at least a dichroic surface, and
the predetermined wavelength band includes a cutoff wavelength of the dichroic surface.

3. The illumination apparatus according to claim 1, wherein
the color separation unit is a color wheel configured to be rotatable and having a disc-shaped board surface, and
a normal line of the board surface provided to the color wheel is inclined with respect to an optical axis of the light emitted from the light source.

4. The illumination apparatus according to claim 1, wherein the predetermined wavelength band includes either a wavelength band between a wavelength band of a blue component light and a wavelength band of a green component light, or a wavelength band between the wavelength band of the green component light and a wavelength band of a red component light.

5. A projection display apparatus comprising:
a light source;
a reflective light valve configured to modulate light emitted from the light source;
a projection unit configured to project light outputted from the reflective light valve onto a projection plane;
a polarization conversion element configured to align polarization directions of the light emitted from the light source in a one polarization direction;
a color separation unit configured to separate the light whose polarization directions are aligned in the one polarization direction by the polarization conversion element; and
a polarization adjustment element configured to adjust a polarization state of light in a predetermined wavelength band within a wavelength range of the light emitted from the light source, wherein
the polarization adjustment element is provided between the polarization conversion element and the color separation unit on an optical path of the light emitted from the light source and
the polarization adjustment element adjusts a ratio of a P polarization component and a S polarization component included in light having the predetermined wavelength band in accordance with applied voltage to the polarization adjustment element.

* * * * *